United States Patent
Acar et al.

(10) Patent No.: US 11,719,525 B2
(45) Date of Patent: Aug. 8, 2023

(54) ADAPTIVE POSITION DETECTION FOR INDUCTIVE LINEAR POSITION SENSING

(71) Applicant: Renesas Electronics America Inc., Milpitas, CA (US)

(72) Inventors: Damla S. Acar, La Mesa, CA (US); Pooja Agrawal, Milpitas, CA (US); Ashley M. De Wolfe, San Diego, CA (US); Gustavo James Mehas, Mercer Island, WA (US); Nicholaus W. Smith, La Mesa, CA (US)

(73) Assignee: Renesas Electronics America Inc., San Jose, CA (US)

( * ) Notice: Subject to any disclaimer, the term of this patent is extended or adjusted under 35 U.S.C. 154(b) by 0 days.

(21) Appl. No.: 17/505,750

(22) Filed: Oct. 20, 2021

(65) Prior Publication Data

US 2023/0120972 A1 Apr. 20, 2023

(51) Int. Cl.
| | |
|---|---|
| *G01B 7/14* | (2006.01) |
| *G06F 1/16* | (2006.01) |
| *G06F 3/04845* | (2022.01) |
| *G01D 5/20* | (2006.01) |

(52) U.S. Cl.
CPC ............ *G01B 7/14* (2013.01); *G01D 5/20* (2013.01); *G06F 1/1615* (2013.01); *G06F 3/04845* (2013.01)

(58) Field of Classification Search
CPC .......... G01B 7/14; G01D 5/20; G06F 1/1615; G06F 3/04845
See application file for complete search history.

(56) References Cited

U.S. PATENT DOCUMENTS

| | | | |
|---|---|---|---|
| 6,261,247 B1 * | 7/2001 | Ishikawa | A61B 5/06 606/1 |
| 9,581,426 B2 * | 2/2017 | Okamoto | G01D 5/2451 |
| 9,632,606 B1 * | 4/2017 | Olson | G06F 3/0418 |
| 11,314,845 B2 * | 4/2022 | Fenney | G06F 17/175 |
| 2021/0124078 A1 * | 4/2021 | Widmer | G01V 3/088 |

* cited by examiner

*Primary Examiner* — Akm Zakaria
(74) *Attorney, Agent, or Firm* — Scully, Scott, Murphy & Presser, P.C.

(57) ABSTRACT

Methods and systems for determining a position of a structure using inductive position sensing are described. In an example, a processor may receive a plurality of data points representing a plurality of voltages. The plurality of voltages may be generated by a plurality of sensor coils based on a magnetic flux field. The magnetic flux field may be generated by a plurality of driver coils, and the plurality of voltages may vary with changes in the magnetic flux field. The processor may calibrate the plurality of data points to generate a plurality of calibrated data points. The processor may filter the plurality of calibrated data points. The processor may estimate a position of the structure based on the filtered calibrated data points, where the position of the structure may indicate a size of a size changing device.

20 Claims, 15 Drawing Sheets

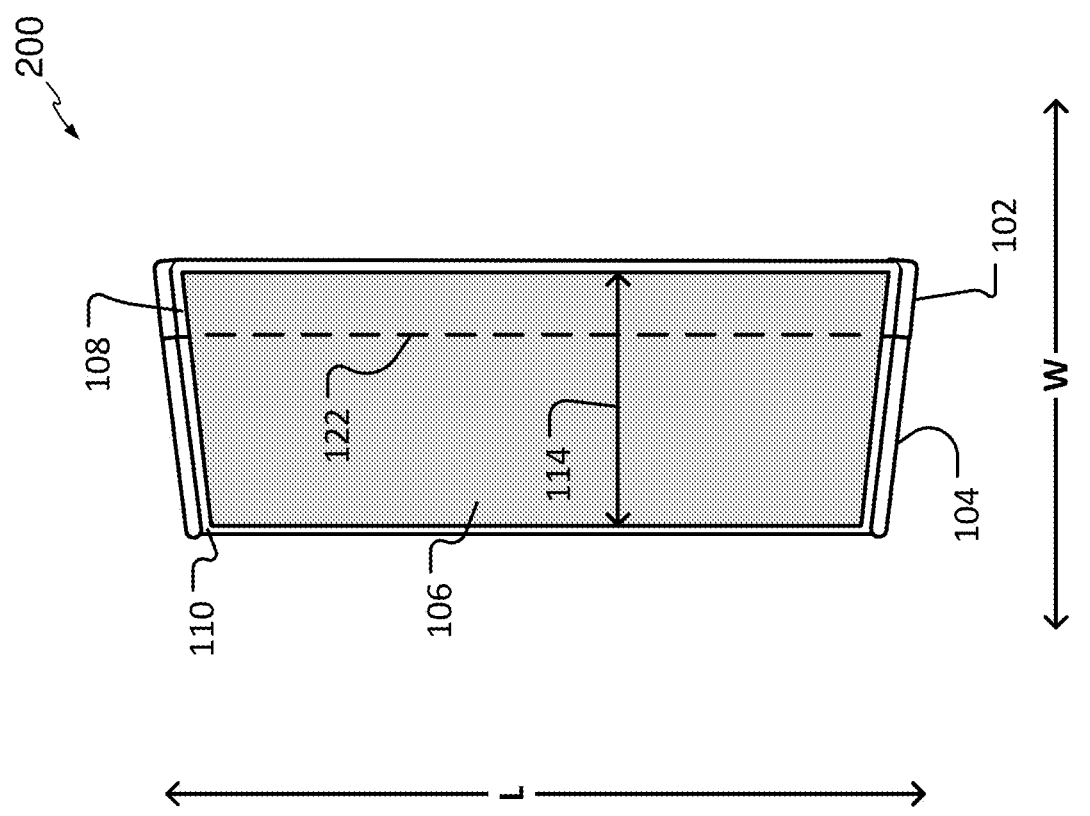

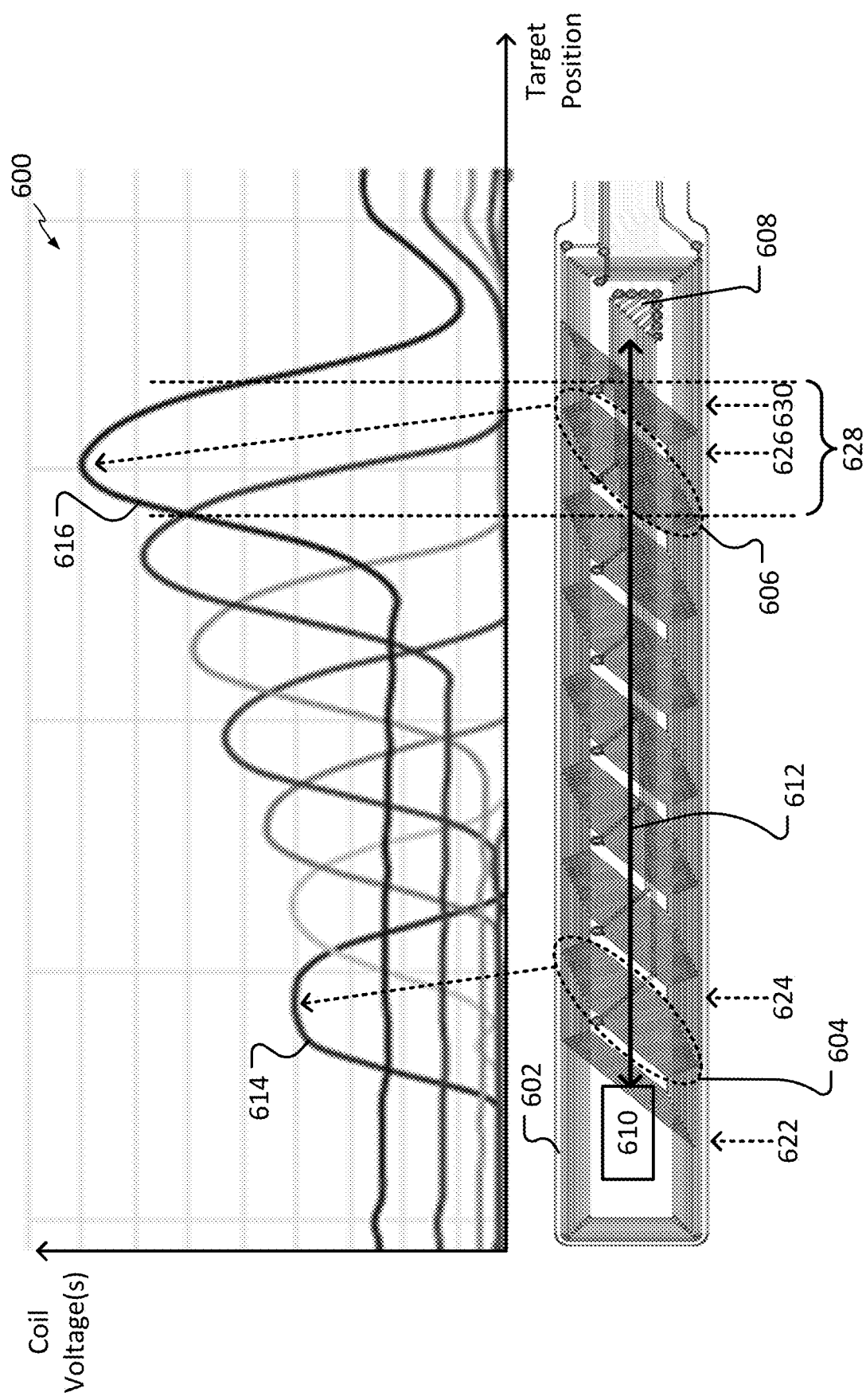

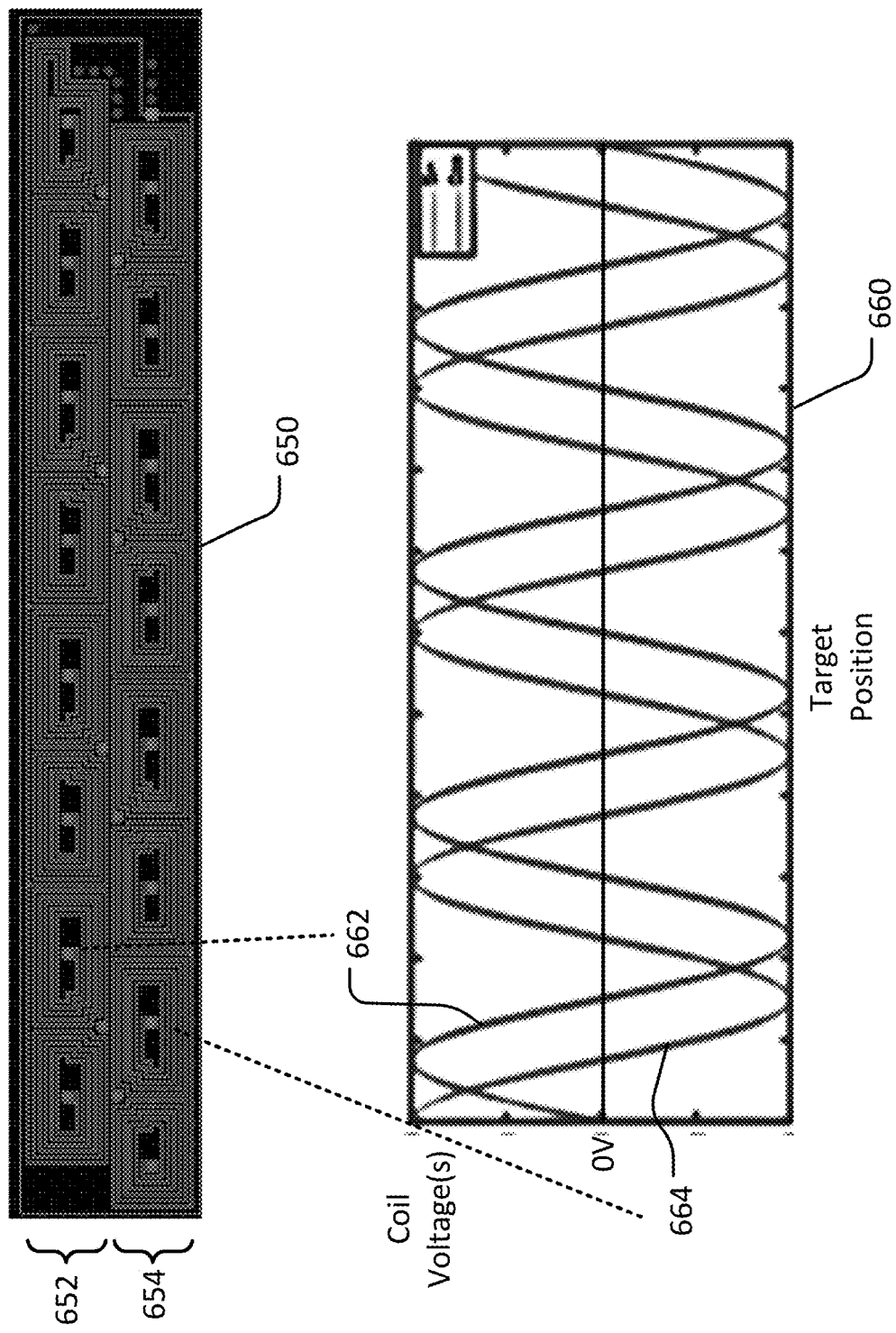

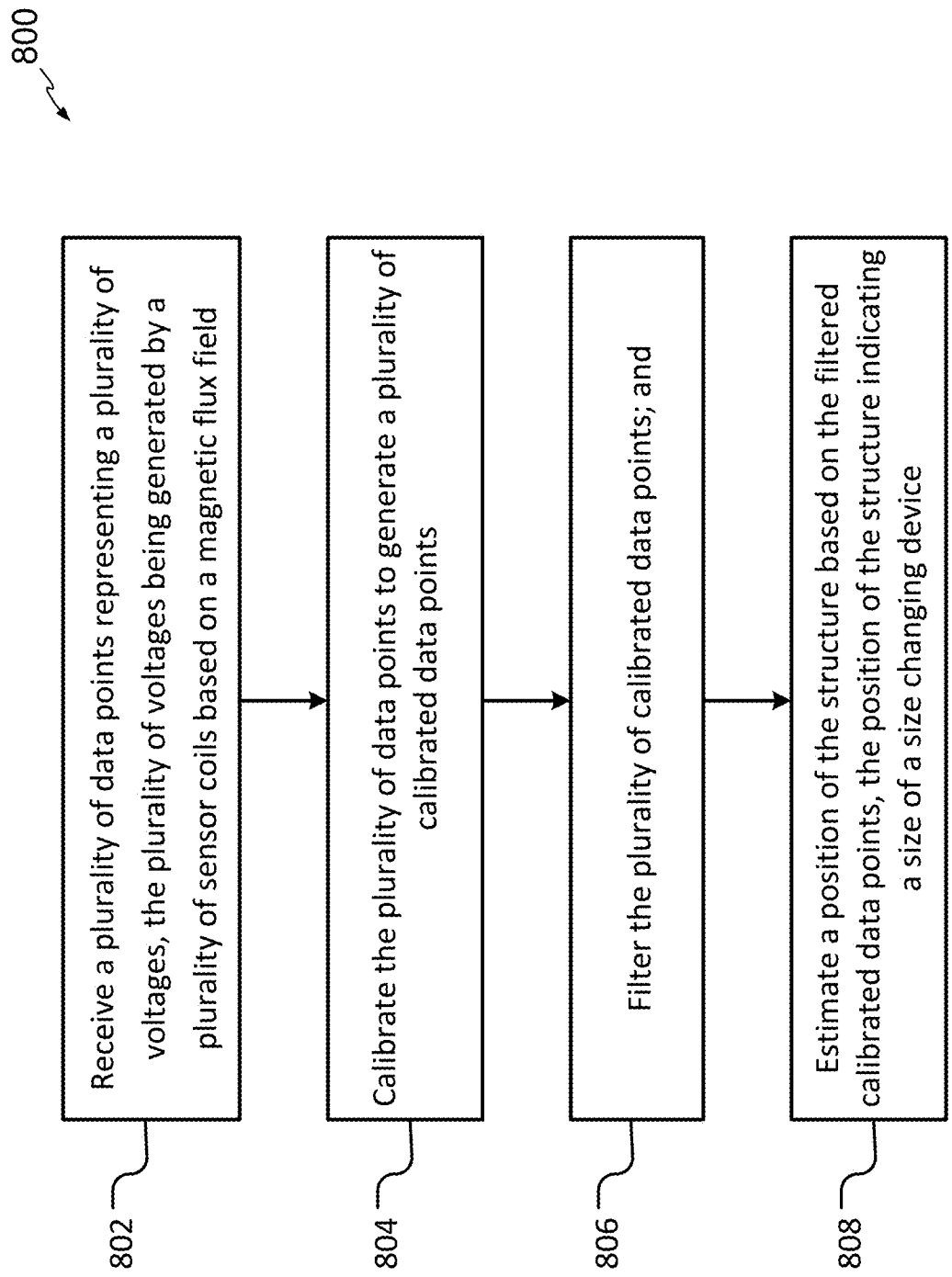

ADAPTIVE POSITION DETECTION FOR INDUCTIVE LINEAR POSITION SENSING

TECHNICAL FIELD

The present disclosure relates generally to digital displays for computing systems, and more particularly, to display screens for smart phones and other handheld personal computing devices.

BACKGROUND

Unless otherwise indicated herein, the materials described in this section are not prior art to the claims in this application and are not admitted to be prior art by inclusion in this section.

Smart phones, tablets, and other personal computing devices feature screens displaying graphical user interface (GUI) elements. For example, a user may tap or drag icons to initiate the display of one or more windows containing a photograph, electronic email, or video content on a screen. Certain computing devices, such as slider phones, have a flexible display screen that allow a user to selectively unfurl or roll up desired portions of the flexible display screen. In such applications, an operating system onboard the computing devices uses the selected, effective dimensions of the flexible display screen to accurately present and support the GUI elements.

In an example, an adjustable display may incorporate inductive position sensing technologies for position sensing (e.g., sensing an amount of expansion of a rollable or stretchable touch screen display). The adjustable display may be very compact in design, thus requiring small inductive sensing elements with multiple coils. This may present a challenge to detect the position using the multi-dimensional array of data from these coils. For example, the inductive position sensing data is very susceptible to flux changes. Slight change in a system platform such as coil or ferrite design may affect the system's ability to effectively measure a position of the display. Thus, high resolution of the inductive position sensing data may be desirable as higher resolution may improve an accuracy of the inductive position sensing data. However, noise among the inductive position sensing data may increase as the resolution increases, requiring more power to process the high resolution data and the accompanying noise. The adjustable display, when being used on compact devices such as handheld electronics, are powered by relative low power batteries. Therefore, an inductive position sensing system or application that may achieve high accuracy while using low power is desirable.

SUMMARY

In some examples, a method of inductively determining a position of a display screen of a computing device is generally described. The method may include receiving a plurality of data points representing a plurality of voltages. The plurality of voltages may be generated by a plurality of sensor coils based on a magnetic flux field. The magnetic flux field may be generated by a plurality of driver coils. The plurality of voltages may vary with changes in the magnetic flux field. The method may further include calibrating the plurality of data points to generate a plurality of calibrated data points. The method may further include filtering the plurality of calibrated data points. The method may further include estimating a position of the structure based on the filtered calibrated data points. The position of the structure may indicate a size of a size changing device.

In some examples, an apparatus including an integrated circuit configured to inductively determine a position of a display screen of a computing device is generally described. The apparatus may include a memory and a processor configured to be in communication with the memory. The processor may be configured to receive a plurality of data points representing a plurality of voltages. The plurality of voltages may be generated by a plurality of sensor coils based on a magnetic flux field. The magnetic flux field may be generated by a plurality of driver coils, and the plurality of voltages may vary with changes in the magnetic flux field. The processor may be further configured to calibrate the plurality of data points to generate a plurality of calibrated data points. The processor may be further configured to filter the plurality of calibrated data points. The processor may be further configured to estimate a position of a structure based on the filtered calibrated data points. The position of the structure may indicate a size of a size changing device.

In some examples, a least one non-transitory computer-readable medium comprising instructions that, in response to execution of the instructions by a processor, cause the processor to perform the following operations is generally described. More particularly, the processor may receive a plurality of data points representing a plurality of voltages. The plurality of voltages may be generated by a plurality of sensor coils based on a magnetic flux field. The magnetic flux field may be generated by a plurality of driver coils, and the plurality of voltages may vary with changes in the magnetic flux field. The processor may further calibrate the plurality of data points to generate a plurality of calibrated data points. The processor may further filter the plurality of calibrated data points. The processor may further estimate a position of the structure based on the filtered calibrated data points. The position of the structure may indicate a size of a size changing device.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 2B shows a perspective view of the slider phone device, such as the device 100 of FIG. 1A, in a collapsed screen position in one embodiment.

FIG. 6A illustrates an example coil configuration that may implement adaptive position detection for inductive linear position sensing in one embodiment.

FIG. 6B illustrates another example coil configuration that may implement adaptive position detection for inductive linear position sensing in one embodiment.

FIG. 8 is a flowchart of an example process that may implement adaptive position detection for inductive linear position sensing in one embodiment.

DETAILED DESCRIPTION

Figure 1A:
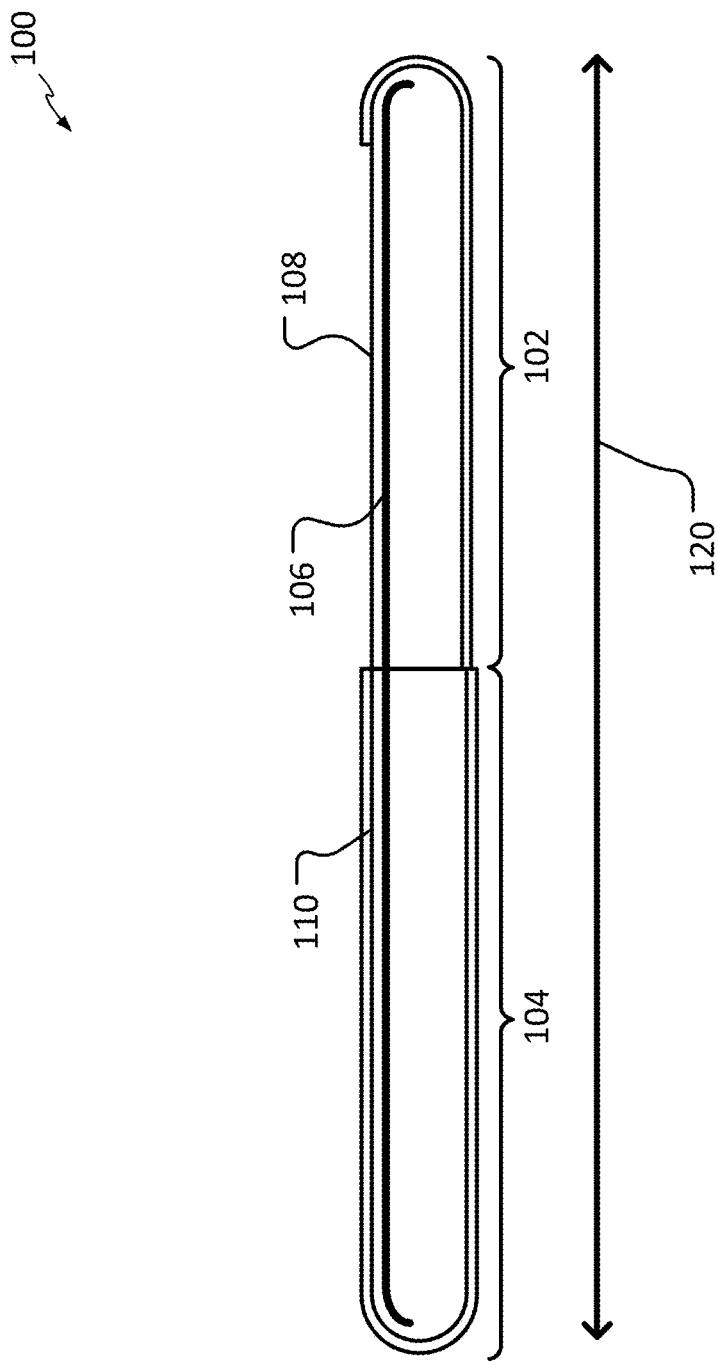
FIG. 1A shows a side view of a slider phone device in an expanded screen position in one embodiment.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

In an example, an inductive position sensing system may determine a position, or an amount of expansion, of an adjustable display of a device (e.g., rollable or stretchable touch screen of a smart phone). The inductive position sensing system may be a part of the device, and may include multiple sets of coil wirings that may be configured for inductive position sensing. In an example, a subset of the coil wirings may be configured as driver coils to generate magnetic flux field. Another subset of the coil wirings may be configured as sensor coils to form a transformer with the driver coils. The sensor coils may pick up the magnetic flux field and generate voltages accordingly. The generated voltages may be measured and converted to digital data using an analog-to-digital converter (ADC). The digital data outputted from the ADC may be raw data (e.g., unfiltered) representing voltage values picked up by the sensor coils at different positions along the adjustable display's movement path.

The inductive position sensing system may use the raw data to determine the position, or the amount of expansion, of the adjustable display of a device. For example, the magnetic flux field may change in response to a movement of the adjustable display. The changes in the magnetic flux field may cause the voltages generated by the sensor coils and the raw data to change with the movement. The inductive position sensing system may use the changes to the raw data to determine a position of the adjustable display.

In an example, the inductive position sensing system may store associations or mappings between the raw data of different sensor coils and positions of the adjustable display. In response to a movement of the adjustable display, a new voltage may be generated by the sensor coils and the ADC may output a new set of raw data. In an example, the inductive position sensing system may apply curve fitting techniques to match the new raw data to the stored associations to identify a position of the adjustable display. A resolution of the stored associations may impact an accuracy of the inductive position sensing system. For example, if a relatively small number of points are mapped to a region along the movement path of the adjustable display (e.g., low resolution), then it may be difficult to obtain a good match between the new raw data and the stored associations. However, increasing the resolution (e.g., more points mapped to a region) may require additional power and storage, which may be difficult to achieve for compact devices (e.g., smart phones) that may not be able to support high power applications. In another example, the inductive position sensing system may use a weighted voting algorithm to determine the position of the adjustable display.

The system and methods described herein may improve an accuracy of the inductive position sensing by performing a process to narrow and/or refine a range of possible positions of the adjustable display. The process may include four sequential steps or stages: 1) calibration, 2) zone or region detection, 3) quadrant or sector detection, and 4) interpolation. The zone detection and quadrant detection stages may be stages that can filter the received raw data such that a relatively smaller amount of raw data may be processed for determining the position of the adjustable display. The inductive position sensing system may perform these four stages to estimate a position of the adjustable display. The estimated position may be inputted to an infinite impulse response (IIR) filter, and a previous position of the adjustable display (e.g., previous output by the IIR filter) may be fed back to the IIR filter via a feedback path of the IIR filter. The IIR filter may output an infinite impulse response (IIR) that may represent a new or adjusted position of the display screen. The adjusted position may indicate a visible and usable surface area of the display screen. The application of the IIR filter may correct the estimated position using the previous position.

FIG. 1A shows a side view of a slider phone device in an expanded screen position in one embodiment. A first section 102 of the slider phone device 100 may be configured to slide into a second section 104 of the slider phone device 100. A size changing device, such as a flexible display screen 106 may be attached proximate to respective top surfaces 108, 110 of the first and second sections 102, 104. The display screen 106 may be configured to selectively slide underneath the top surfaces 108, 110 of the first and second sections 102, 104, respectively. At least a portion of the top surfaces 108, 110 may be constructed from a translucent material, such as glass or plastic, to minimize obstructing a view the display screen 106 from the user.

Sliding the first and second sections 102, 104 back and forth with respect to one another, in a direction 120, may expand and contract the visible and usable surface area of the display screen 106. One implementation may use motors to actuate one or more of the first and second sections 102, 104. Another configuration may allow the hands of the user to manipulate the relative positions of the first and second sections 102, 104, and in so doing, the visible and usable surface area of the size changing device or the display screen 106.

Figure 1B:
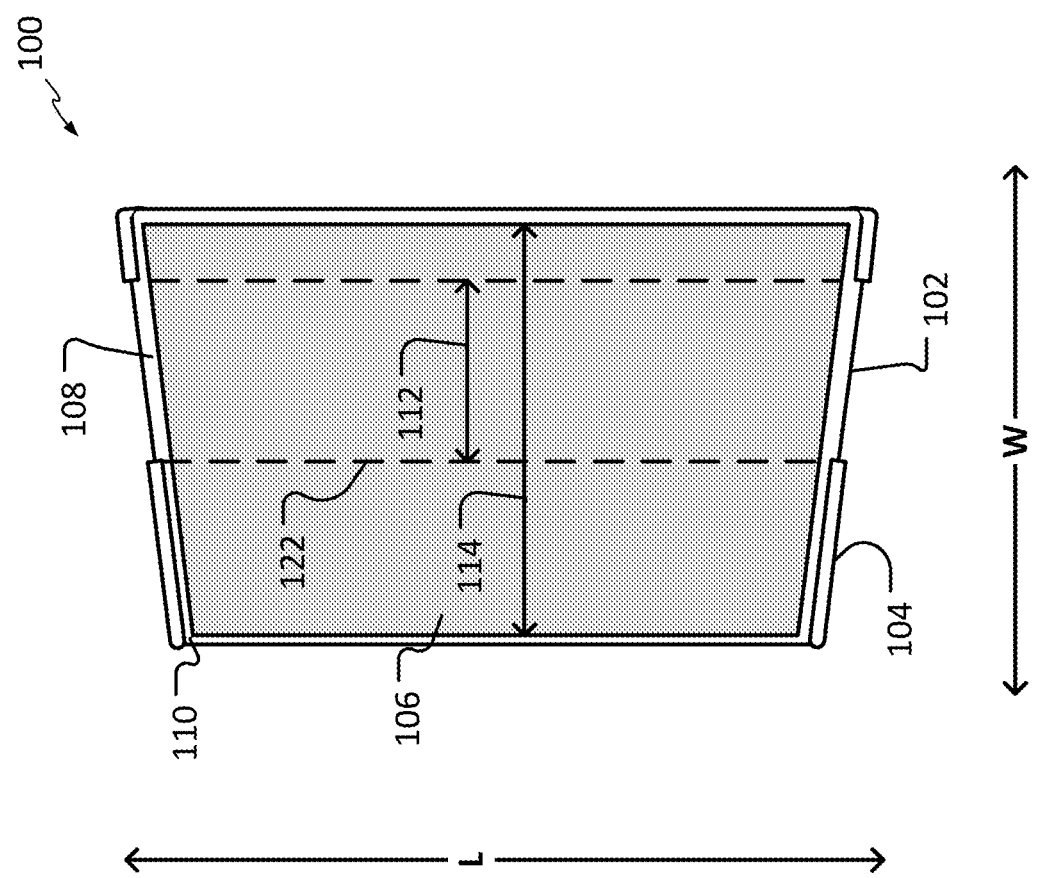
FIG. 1B shows a perspective view of the slider phone device of FIG. 1A in an expanded screen position in one embodiment.

FIG. 1B shows a perspective view of the slider phone device 100 of FIG. 1A in an expanded screen position in one embodiment. As illustrated, the display screen 106 is expanded nearly to its maximum size. That is, the first and second sections 102, 104 have been slid linearly in opposite directions from one another to expand the visible and usable surface area of the display screen 106. In the example shown in FIG. 1B, as a result of sliding the first and second sections 102, 104 linearly in opposite directions from one another, the visible and usable surface area of the display screen 106 is expanded by a distance 112 from a reference position 122. In an example, the reference position 122 may define a minimum size of the display screen 116 (e.g., when distance 112 is zero). By expanding the visible and usable surface area of the display screen 106 by the distance 112, a total surface area spanning a width of 114, in the W direction, of the display screen 106 can be visible and usable on the slider phone device 100. In another example, the visible and usable surface area of the display screen 106 may be expanded in the L direction. For example, the first and second sections 102, 104 may be arranged in a different orientation such that they may be moved back and forth with respect to one another in the L direction to expand and contract the visible and usable surface area of the size changing device or the display screen 106 in the L direction.

In the manner described above, a user may select a preferred size of the flexible display screen 106 for a particular activity. As discussed herein, an operating system (not shown) internal to the slider phone device 100 may receive data pertaining to the current position (e.g., an expanded distance such as distance 112, or status indicators such as expanded or nearly expanded) of the display screen 106 in order to effectively arrange and display icons and other GUI elements on the display screen 106.

Figure 2A:
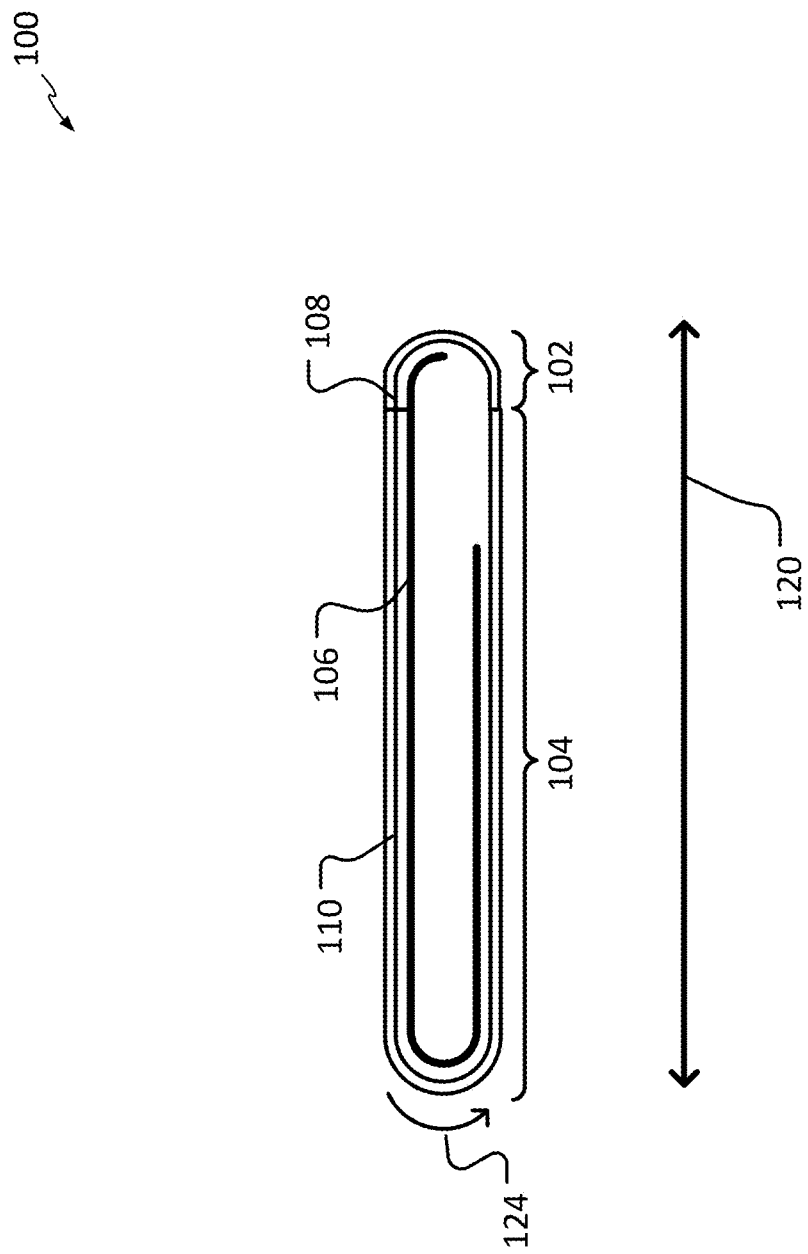
FIG. 2A shows a side view of a slider phone device, such as the device of FIG. 1A, in a collapsed screen position in one embodiment.

FIG. 2A shows a side view of a slider phone device, such as the device 100 of FIG. 1A, in a collapsed screen position in one embodiment. As the first section 102 slides into the second section 104, the useful area and visible portion of the size changing device or the display screen 106 is reduced and/or minimized. In the example show in FIG. 2A, the display screen may be flexible and rollable such that at least a portion of the display screen 106 may roll towards a direction 124 as a result of sliding the first and second sections 102, 104, into the collapsed screen position.

FIG. 2B shows a perspective view of the slider phone device, such as the device 100 of FIG. 1A, in a collapsed screen position in one embodiment. As illustrated, the visible and usable surface are of the size changing device or the display screen 106 is contracted its minimum screen size (e.g., distance 112 from reference position 122 in FIG. 1B is zero and the width 114 is at a minimum value). That is, the first section 102 shown in FIG. 1B and the second section 104 shown in FIG. 1A and FIG. 1B have been slid linearly towards one another, such that the first section 102 is inside of the second section 104 to contract the visible and usable surface area of the display screen 106.

One skilled in the art will appreciate that implementations of the system discussed herein contemplate all display screen positions between fully expanded and contracted. For example, a configuration may constantly determine new positions (and associated display surface areas and layouts) as the display screen is being adjusted between and expanded and contracted positions, or some intermediary position.

Figure 3:
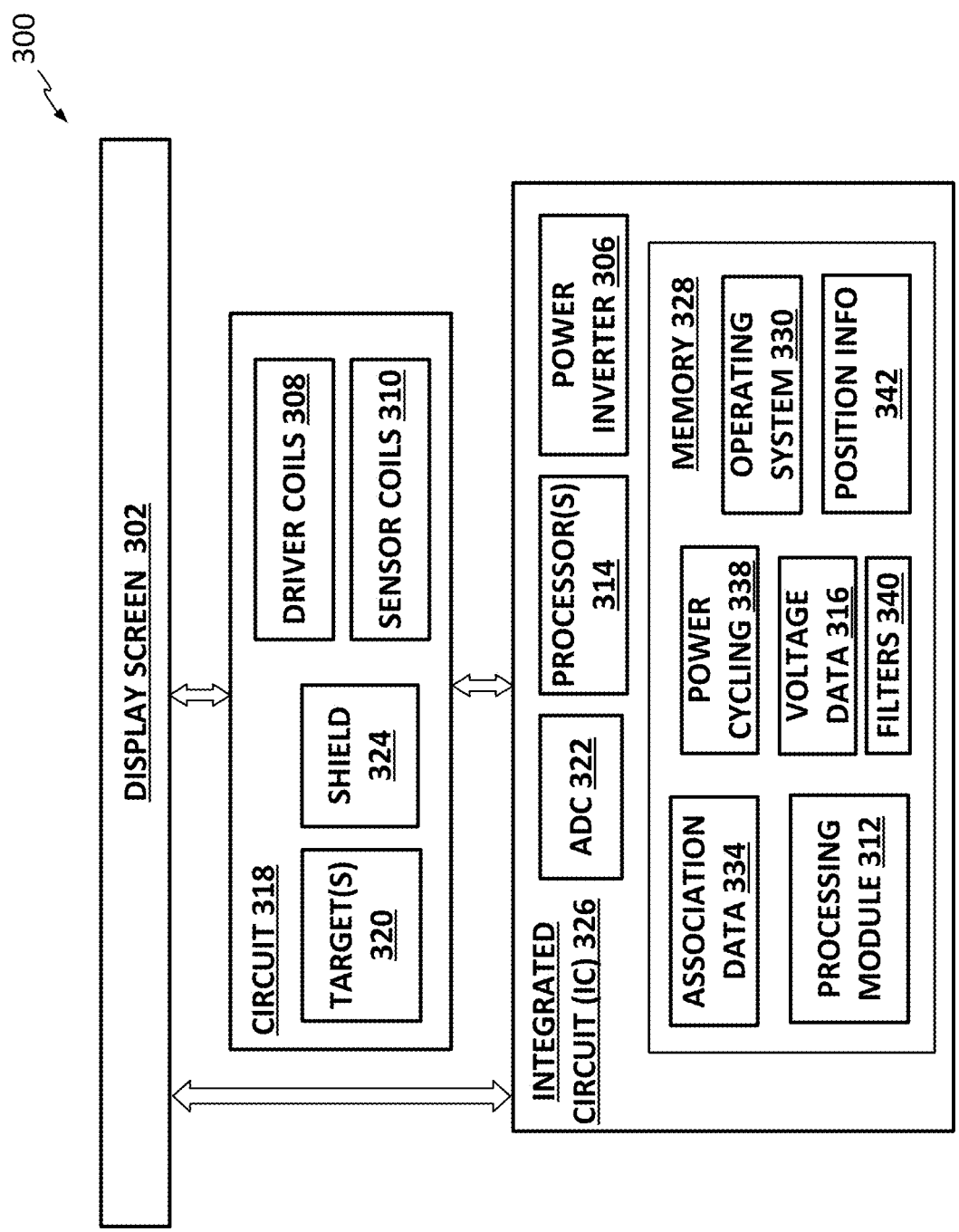
FIG. 3 is a block diagram of a system that may implement adaptive position detection for inductive linear position sensing in one embodiment.

FIG. 3 is a block diagram of a system that may implement adaptive position detection for inductive linear position sensing in one embodiment. The system 300 may be configured for inductively determining a position, or a visible and usable surface area, of size changing device such as a display screen of a computing device (e.g., display screen 106 of FIG. 1A to FIG. 2B). In an example, the system 300 may include a display screen 302, a circuit 318, and an integrated circuit (IC) 326. The display screen 302 may be a high resolution display screen that may be adjustable in position, in size (e.g., dimensions such as width and/or length), and in size of visible and usable surface area. The circuit 318 may be an inductive position sensing circuit configured for determining a position, or an amount of expansion, of the display screen 302. The IC 326 may include various hardware processors, integrated circuits, memory devices, and/or processing modules, etc. In an example, the arrows shown in FIG. 3 may represent the exchange of power, computing instructions, and other data or signals between the display screen 302, the circuit 318, and the IC 326.

In an example, the circuit 318 may include one or more structures or targets 320, a shield 324, a set of driver coils 308, and a set of sensor coils 310. The driver coils 308 may be configured to generate a magnetic flux field. The sensor coils 310 may form a transformer with the driver coils 308, and may be configured to pick up the magnetic flux field and generate voltages. The targets 320 may include one or more magnetically active metals, such as ferrite. The shield 324 may be component for protecting circuitry among the system 300 and for focusing the magnetic influence of the targets 320. For example, the shield 324 may be positioned to contain and concentrate the magnetic flux field generated by the driver coils 308. The circuit 318 may output the voltages generated by the sensor coils 310 to the IC 326.

The IC 326 may include a processor 314, a power inverter 306, and a memory 328. In an example, the power converter 306 may provide alternating current to the driver coils 308 to cause the driver coils 308 to generate the magnetic flux field. In an example, the memory 328 may store an operating system 330 that may receive position information 342 to configure graphical user interface (GUI) elements on the display screen 302. The IC 326 may further include an analog-to-digital converter (ADC) 322. The ADC 322 may be configured to receive the voltages generated by the sensor coils 310 from the circuit 318. The ADC 322 may be configured to convert the received voltages into digital data, where the digital data may be stored in the memory 328 as voltage data 316.

The memory 328 may also be configured to store association data 334 that includes associations or mappings between voltages generated by the sensor coils 310 and positions along a movement path of the display screen 302. The memory 328 may further store a processing module 312 that may be configured to determine a position, or a visible and usable surface area, of the display screen 302. In an example, the processing module 312 may be configured to use the voltage data 316 and/or the association data 334 to determine the position, or a visible and usable surface area, of the display screen 302. The processing module 312 can include, for example, an IC and/or a set of programmed code (e.g., an algorithm) configured for determining a position, or a visible and usable surface area, of the display screen 302. The memory 328 may further store filtering programs 340 ("filters 340") that may include, for example, filters that may remove system noise, or other types of filters that may be needed to implement the system 300.

In an example, the processing module 312 may be executed by the processor 314 to perform a four-stage process for estimating a position, or a visible and usable surface area, of the display screen 302. The four stage process may include four sequential stages: 1) calibration, 2) zone detection, 3) quadrant or sector detection, and 4) interpolation. The zone detection and sector detection stages may be stages that can filter the voltage data 316 such that a relatively smaller amount of digital data may be processed by the processing module 312 and/or the processor 314 to estimate the position of the display screen 302. The estimated position, and a previous position of the display screen 302 may be inputted to an IIR filter (e.g., among the filters 340) to determine an adjusted or current position, or a visible and usable surface area, of the display screen 302. The application of the IIR filter may correct the estimated position using the previous position, in case the estimated position deviates too much from the previous position.

In an example, an implementation of system 300 may use a single IC 326 to control both the driver coils 308 and the sensor coils 310. This configuration may obviate a need for power transfer under certain conditions. For example, there may be no need to have a power transfer as the IC 326 may be powered by the voltages generated by the sensor coils 310. In other implementations, data may be relayed among wirelessly (e.g., using amplitude shift key (ASK) back channel communication techniques) the IC 326 and the circuit 318. The driver coils 308 and the sensor coils 310 may provide a constant, continuous or intermittent set of detection signals over an entire length of which the position of the display screen 302 is being monitored. Further, a power cycling circuit 338 may be operated by the processor 314 to prevent position measurements or determinations from being continuously taken in order to preserve power and avoid damage to vulnerable circuitry, and to minimize an amount of energy used during an operation to determine a position, or a visible and usable surface area, of the display screen 302.

Figure 4:
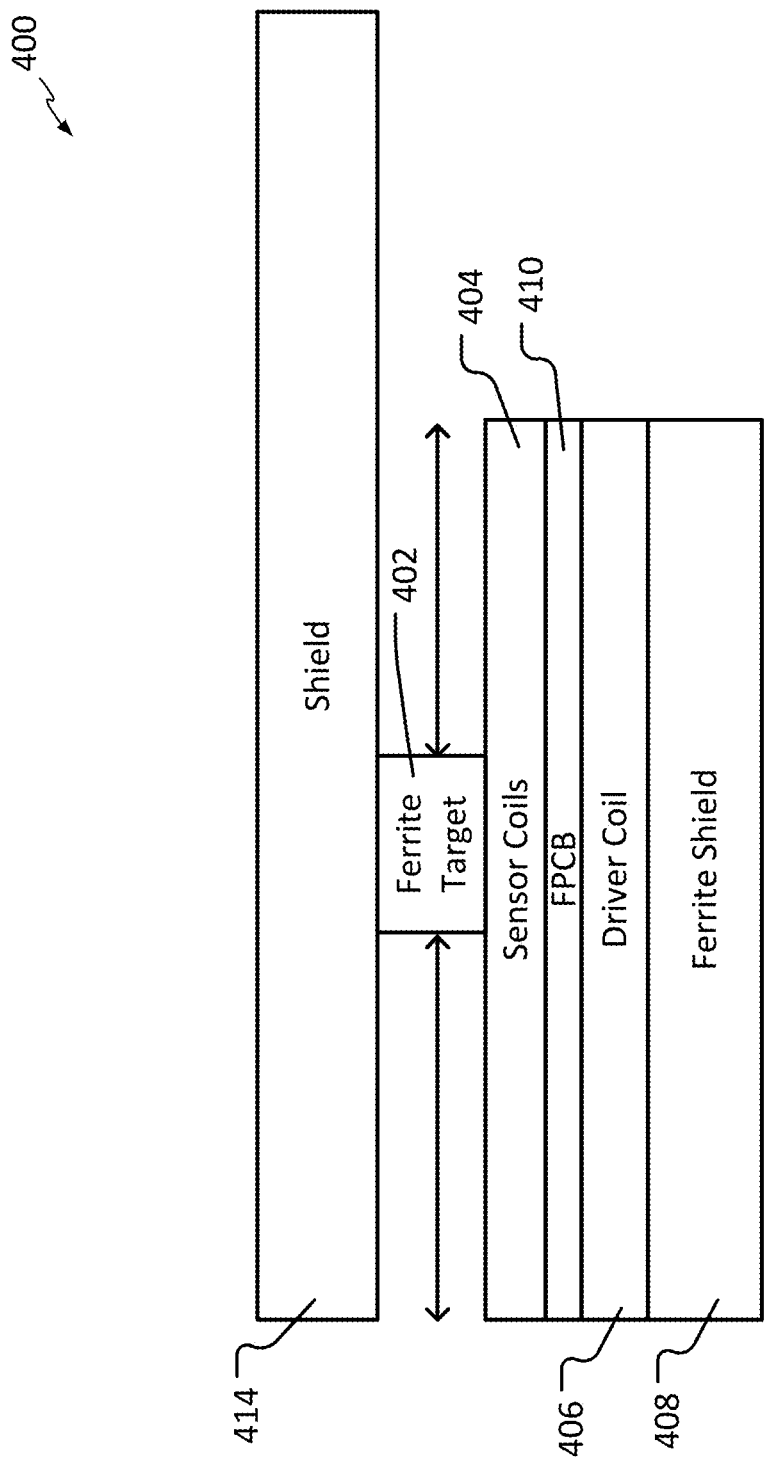
FIG. 4 is a block diagram of an example circuit that may implement adaptive position detection for inductive linear position sensing in one embodiment.

FIG. 4 is a block diagram of an example circuit 400 that may implement adaptive position detection for inductive linear position sensing in one embodiment. The circuit 400 may be configured as the circuit 318 of FIG. 3. In an example, the circuit 400 may be located beneath and proximate to the display screen of a device, such as a smart phone. For example, the circuit 400 may be located beneath and proximate to the display screen 106 of the slider phone device 100 of FIG. 1A, where the circuit 400 and the display screen 106 may be separated by diffuser and light emitting diode (LED) backlit layers. The circuit 400 may include one or more structures referred to as targets, such as a target 402, a shield 414, one or more sets of sensor coils 404, a flexible printed circuit board (FPCB) 410, a driver coil 406, and a ferrite shield 408. The target 402 may be attached to a portion of the device that includes the display screen. Alternatively, the target 402 may be attached to a base of a device and opposite to the display screen. The driver coil 406 may be inductively couple with the sensor coils 404. The FPCB 410 may be sandwiched between the driver coil 406 and sensor coils 404. The ferrite shield 408 may be positioned proximate to the driver coil 406.

The target 402 may be proximate to sensor coils 404 and the shield 414, and may traverse a distance (e.g., indicated by arrows in FIG. 4). In an example, the target 402 may comprise an object that influences a magnetic field. The target is typically not a magnet, itself, but may include for instance, copper or a soft magnetic material, or other magnetically active metals. A soft magnetic material may comprise a metal that is readily magnetized and demagnetized, such as ferrite. Moreover, differently shaped targets are contemplated. The shape of the target 402 may be selected to facilitate generating a desired magnetic field. While only one target is shown in FIG. 4, other implementations may use multiple targets.

The driver coil 406 may receive alternating current power from, for example, the power converter 306 in FIG. 3. The driver coil 406 may generate a magnetic flux field and the sensor coils 404 may pick up the magnetic flux field. As a result of picking up the magnetic flux field, the sensor coils 404 may generate a voltage. In an example, the shield 414 may be a ferrite shield. The shield 414 may be positioned to contain and concentrate the magnetic field for efficiency considerations. In an example, as the target 402 moves, the magnetic flux field between the driver coil 406 and the sensor coils 404 may vary. The voltages being generated by the sensor coils 404 may vary with the changes to the magnetic flux field. In an example, the voltages being generated by the sensor coils 404 may be inputted to the ADC 322 in FIG. 3, and the processing module 312 in FIG. 3 may use the digital data outputted from the ADC 322 to determine a position, or a visible and usable surface area, of the display screen.

The sensor coils 404 may generate an increased voltage at locations where the magnetic flux field is concentrated. In the example of FIG. 4, the magnetic flux field may be concentrated by a movement of the target 402. That is, the magnetic flux path inductance and other flux characteristics may be changed due to the movement of the target 402. In other implementations, one or more targets of varying shapes may be used to increase accuracy. In the example, the shield 414 (e.g., a ferrite shield) may be used behind a magnetically active target 402 to improve efficiency and to protect circuitry above the coils 406. The shield 414 may also focus a magnetic influence introduced by the target 402 on the magnetic flux field. An uncontained magnetic field could harm other circuitry in the slider phone. Thus, the shield 414 may be configured and positioned to not substantially reduce the magnetic influence and signature of the target 402.

In another example, the shield 414 may be made of various types of materials, such as aluminum, copper, gold, tin, and/or other types of materials that may be low resistivity materials. In an example, an aluminum shield may make magnetic flux peaks relatively more pronounced and detectable. For example, an aluminum shield may concentrate the magnetic flux and improve coupling between the driver coils 406 and sensor coils 404. The use of aluminum may make the voltage peaks more defined because the eddy current effects of the aluminum may extend outside of the aluminum, thereby causing the voltage being picked up by the sensor coils 404 ("sensor coil voltage") to be suppressed (e.g., lower than a free air configuration). The suppression of the sensor coil voltage may result in a relatively lower baseline (e.g., voltage level indicating no target is present) sensor coil voltage. Hence, when the target is present and the sensor coil voltage is at its maximum, the difference between the maximum sensor coil voltage and the baseline sensor coil voltage may be larger as compared to a system which uses a ferrite shield and/or a non-conductive shield (e.g., magnetically active or otherwise).

Figure 5:
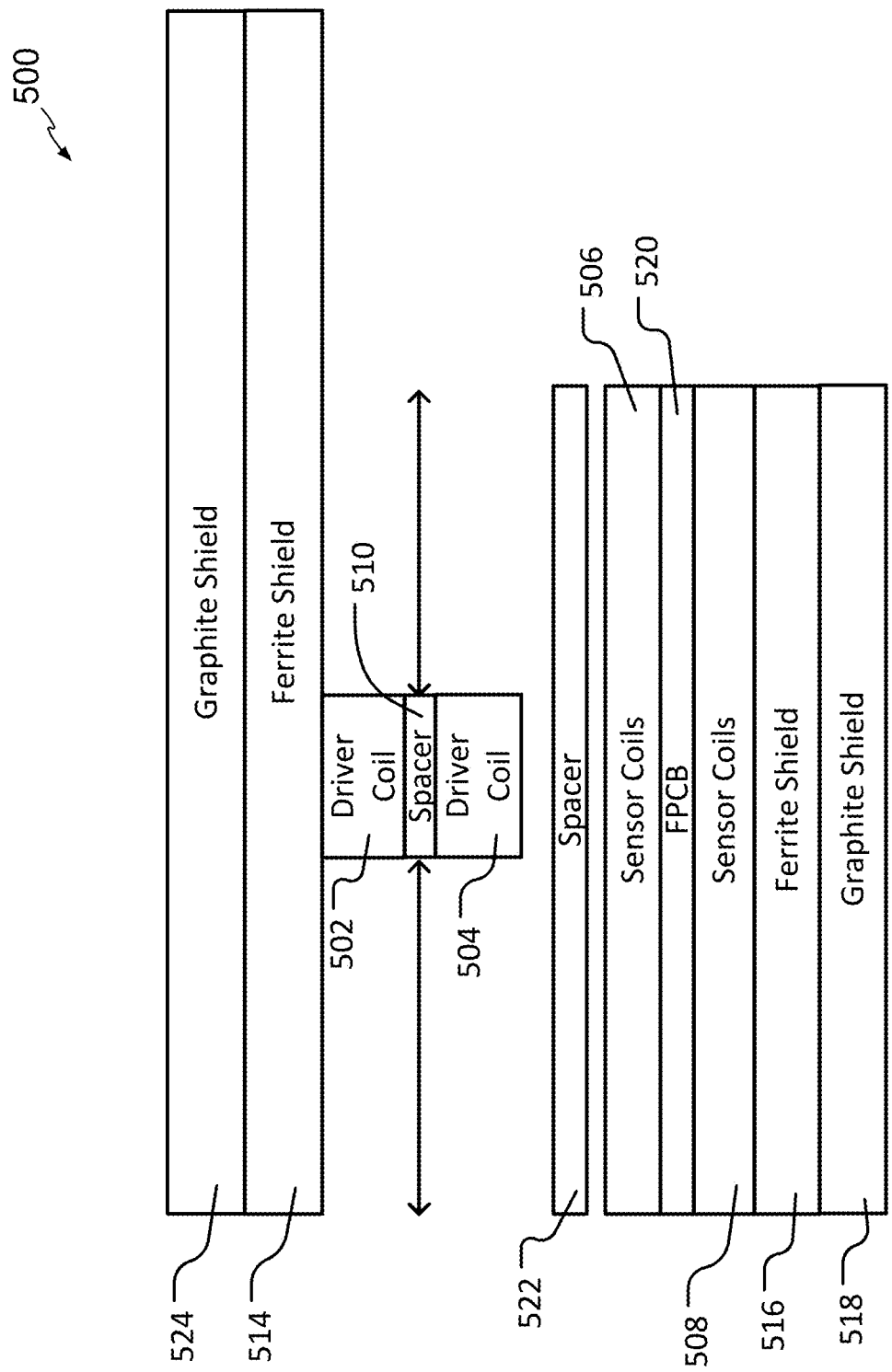
FIG. 5 is a block diagram of another example circuit that may implement adaptive position detection for inductive linear position sensing in one embodiment.

FIG. 5 is a block diagram of another example circuit 500 that may implement adaptive position detection for inductive linear position sensing in one embodiment. The circuit 500 may be configured as the circuit 318 of FIG. 3. In an example, the circuit 500 may be located beneath and proximate to the display screen of a device, such as a smart phone. For example, the circuit 500 may be located beneath and proximate to the display screen 106 of the slider phone device 100 of FIG. 1A, where the circuit 500 and the display screen 106 may be separated by diffuser and light emitting diode (LED) backlit layers. The circuit 500 may include one or more driver coils 502, 504, graphite shield 518, 524, ferrite shields 514, 516, one or more sets of sensor coils 506, 508, and a flexible printed circuit board (FPCB) 520. The driver coil 406 may be inductively coupled with the sensor coils 404. The sensor coils. 506, 508 may be separated by a flexible printed circuit board (FPCB) 520, and the driver coils 502, 504 may be separated from the sensor coils 506, 508 by a spacer 522.

The driver coils 502, 504 may be separated by a spacer 510, where the driver coils 502, 504, and the spacer 510 may form a single structure. The driver coils 502, 504 may traverse a distance indicated by the arrows in FIG. 5. The driver coils 502, 504 may generate a magnetic flux field based on movement of the driver coils 502, 504 with respect to the receiver, or sensor coils 506, 508. When compared to the circuit 400 in FIG. 4, the circuit 500 may be a configuration where a moving object (e.g., driver coils 502, 504) may actively generate a magnetic flux field instead of passively concentrating a magnetic flux field that was already generated as in circuit 400 of FIG. 4. As the driver coils 502, 504 moves, the magnetic flux field may vary. The voltages being generated by the sensor coils 506, 508 may vary with the changes to the magnetic flux field. In an example, the voltages being generated by the sensor coils 506, 508 may be inputted to the ADC 322 in FIG. 3, and the processing module 312 in FIG. 3 may use the digital data outputted from the ADC 322 to determine a position of the display screen.

While a ferrite shield 514 is shown in FIG. 5, another implementation may use a pot core that is positioned around the driver coils 502, 504 to focus magnetic fields on those sensor coils 506, 508 most proximate to the driver coils 502, 504. The ferrite shield 516 may be proximate the sensor coils 506, 508, and the graphite shields 518, 524. One skilled in the art will appreciate that while a target and/or a driver coils 502, 504 may be attached to and move in conjunction with the display screen as in FIG. 5, another implementation may have the sensor coils 506, 508, move with the display screen. Either one of these configurations may result in changes in the magnetic flux field between the driver coils 502, 504 and sensor coils 506, 508. The changes to the magnetic flux field may be detected by, for example, the processing module 312 in FIG. 3. In another example, a target may be a "not target", or "negative target", where the absence of some material is used to modify the voltage response of the sensor coils to a magnetic field.

FIG. 6A illustrates an example coil configuration 600 that may implement adaptive position detection for inductive linear position sensing in one embodiment. The coil configuration 600 may include a rectangularly configured coil wiring 602 that may be partially overlapped by multiple sets of parallelogram-shaped and diagonally oriented coil wirings, such as coil wirings 604 and 606. In the example shown in FIG. 6A, each set of parallelogram-shaped and diagonally oriented coil wiring is oriented in a parallel manner with respect to one other. The coil configuration 600 may also include connecting traces 608 connecting the coil wirings of the coil configuration 600 to an IC, such as the IC 326 in FIG. 3. Voltages being generated by the coil wirings of the coil configuration 600 may be transmitted to, for example, the IC 326 in FIG. 3 via the traces 608.

The coil wirings 602, 604, 606 and other coil wirings among the coil configuration 600, may be used for inductive position sensing. In an example, the coil wirings 602 may be configured as the driver coil 406 shown in FIG. 4, and the coil wirings 602, 606, and other parallelogram-shaped and diagonally oriented coil wirings may be configured as sensor coils 404 shown in FIG. 4. A target 610 (e.g., ferrite target 402 in FIG. 4) may move across the coil wirings of the coil configuration 600 in a direction 612. The coil wiring 602 (driver coil) may generate a magnetic flux field, and the coil wirings configured as sensor coils (e.g., coil wirings 602, 606) may pick up the magnetic flux field and generate a voltage. The magnetic flux field generated by the coil wiring 602 may change in response to movement of the target 610. The changes to the magnetic flux field may change the voltages being generated by the sensor coils (e.g., coil wirings 602, 606). In an example, a location of the target 610 with respect to the driver coil and/or the sensor coil may alter a concentration of the magnetic flux field, where an increase in the concentration of the magnetic flux field may increase the amount or level of voltage being generated by the sensor coils. For example, an example plot shown in FIG. 6A is a plot of coil voltages vs. target position of the target 610. The coil voltages being plotted in FIG. 6A may be voltages sampled (e.g., measured and converted to digital data) by an ADC (e.g., ADC 322 in FIG. 3). The target position of the target 610 may be a position of the target 610 relative to a reference position 622 (e.g., reference position 122 in FIG. 1A). For every position of the target 610, the ADC may sample coil voltages picked up by all coil wirings in the coil configuration 600. Therefore, if there are N sensing coils in a coil configuration, for each position of the target ferrite, N different coil voltages may be sampled by the ADC, where a maximum of the N coil voltages will provide the position of the target. Thus, in the example shown in FIG. 6A, if the target 610 is at a position 624, the magnetic flux field in proximity to the position 624 may be concentrated, and a voltage 614 generated by the coil wiring 604 may increase. Similarly, if the target 610 is at a position 626, the magnetic flux field in proximity to the position 626 may be concentrated, and a voltage 616 generated by the coil wiring 606 may increase. In an example, if the target 610 is at position 624, the voltage 614 may be greater than all other plotted coil voltages (e.g., including voltage 616), which indicates that the target 610 is located at the position 624.

In an example, the coil configuration 600 may be among an inductive sensing circuit (e.g., circuit 318 of FIG. 3) located beneath and proximate to the display screen of a smart phone (e.g., the display screen 106 of the slider phone device 100 of FIG. 1A). An inductive position sensing system (e.g., system 300 in FIG. 3) may detect a position (e.g., amount of expansion) of the display screen by measuring the voltages generated by the sensor coils of the coil configuration 600, such as coil wirings 604, 606. In an example, the reference position 622 may define a minimum expansion value (e.g., zero) of the display screen. Thus, a default position of the target 610 may correspond to the reference position 622 (or may be the reference position 622), and a position of the target 610 may correspond to the position, or a visible and usable surface area, of the display screen. The target 610 may move in the direction 612 away from the reference position 622 as the display screen expands, and towards the reference position 622 as the display screen contracts.

In an example, the voltages 614 and 616 (and other voltages shown in FIG. 6A) may be analog signals that may be inputted into an ADC (e.g., ADC 322 in FIG. 3). The ADC may convert the analog signals into digital data or digital values, and the digital values may be mapped to, or associated with, a zone or region including multiple possible positions along a movement path of the target 610 and/or the display screen. In an example, a peak of each voltage may be mapped to, or associated with, the sensor coil that generated the corresponding voltage, such that a position, or a visible and usable surface area, of the display screen may be determined based on physical locations of the associated sensor coil.

A resolution of mappings (e.g., association data 334 in FIG. 3) may affect an accuracy of the position determination by the inductive position sensing system. In an example, a relatively low resolution may map a peak voltage generated by each sensor coil to one zone or region. Using the example in FIG. 6A as an example, the seven peak voltages of the seven waveforms shown in FIG. 6A may be mapped to seven zones or regions. Thus, if the target 610 is located at a position 630 within a zone or region 628, the inductive position sensing system, based on the low resolution mapping, may set the position 626 (that corresponds to the peak of voltage 616) as the position of the target 610. Thus, low resolution mapping may lead to a low accuracy in determining the position, or a visible and usable surface area, of the adjustable display. A high resolution may be, for example, mapping additional points along the voltage 616 to the zone 628. However, high resolution may require additional power, and compact devices such as mobile devices or smart phones may not be able to provide sufficient power for high resolution mapping. To be described in more detail below, the systems and methods described herein may utilize multiple layers of information or data to estimate a position, or a visible and usable surface area, of the adjustable display, instead of using one layer of data (e.g., association data 334).

FIG. 6B illustrates another example coil configuration 650 that may implement adaptive position detection for inductive linear position sensing in one embodiment. The coil configuration 650 may include one or more sets of differential coils (e.g., pairs of coils) arranged in rectangular configurations. Each set of differential coils in the coil configuration 650 may be shifted by a specific distance from one another, such that each set of differential coils can produce differential signals (e.g., two signals) having a phase difference (e.g., sometimes referred to as a positive signal and negative signal) as a target moves over the coils. The two signals being produced by each set of differential coils can provide higher resolution (e.g., doubled) with the same number of coil input signals.

In the example shown in FIG. 6B, the coil configuration 650 includes a portion 652 and a portion 654. The portion 652 includes a set of first coils, and the portion 654 includes a set of second coils. Each first coil from the portion 652 can form a set of differential coils with a corresponding second coil from the portion 654. A plot 660 can be a plot of target position versus coil voltages of the coils in the coil configuration 650. A voltage 662 is measured from a specific first coil in the portion 652, and a voltage 664 is measured from a specific second coil in the portion 654. The voltages 662 and 664 can be out of phase from one another. The measured voltages and the phase differences can be used for determining a position of a target that moves along the coil configuration 650.

Figure 7A:
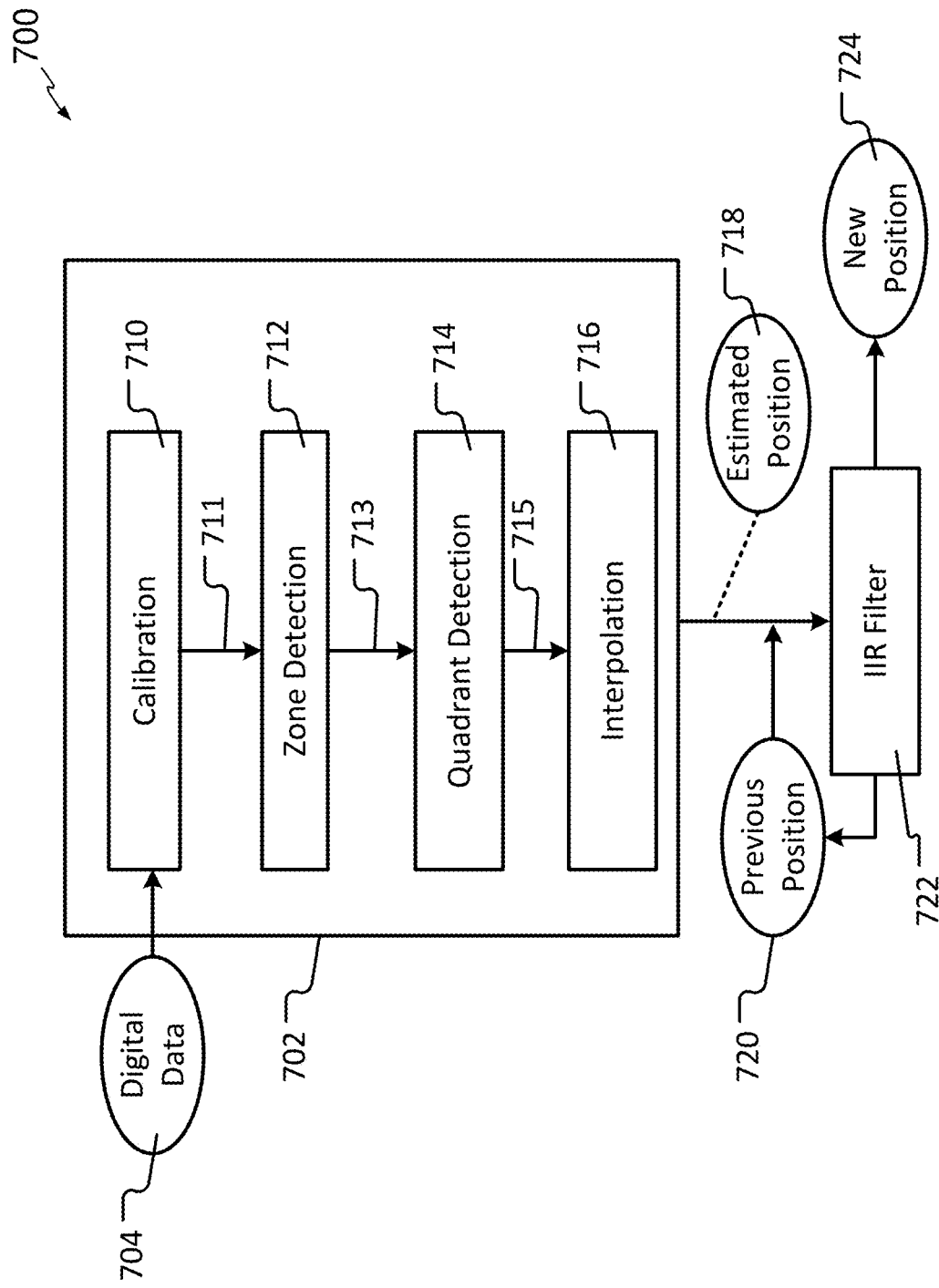
FIG. 7A is a block diagram of a processing module that may implement adaptive position detection for inductive linear position sensing in one embodiment.
Figure 7B:
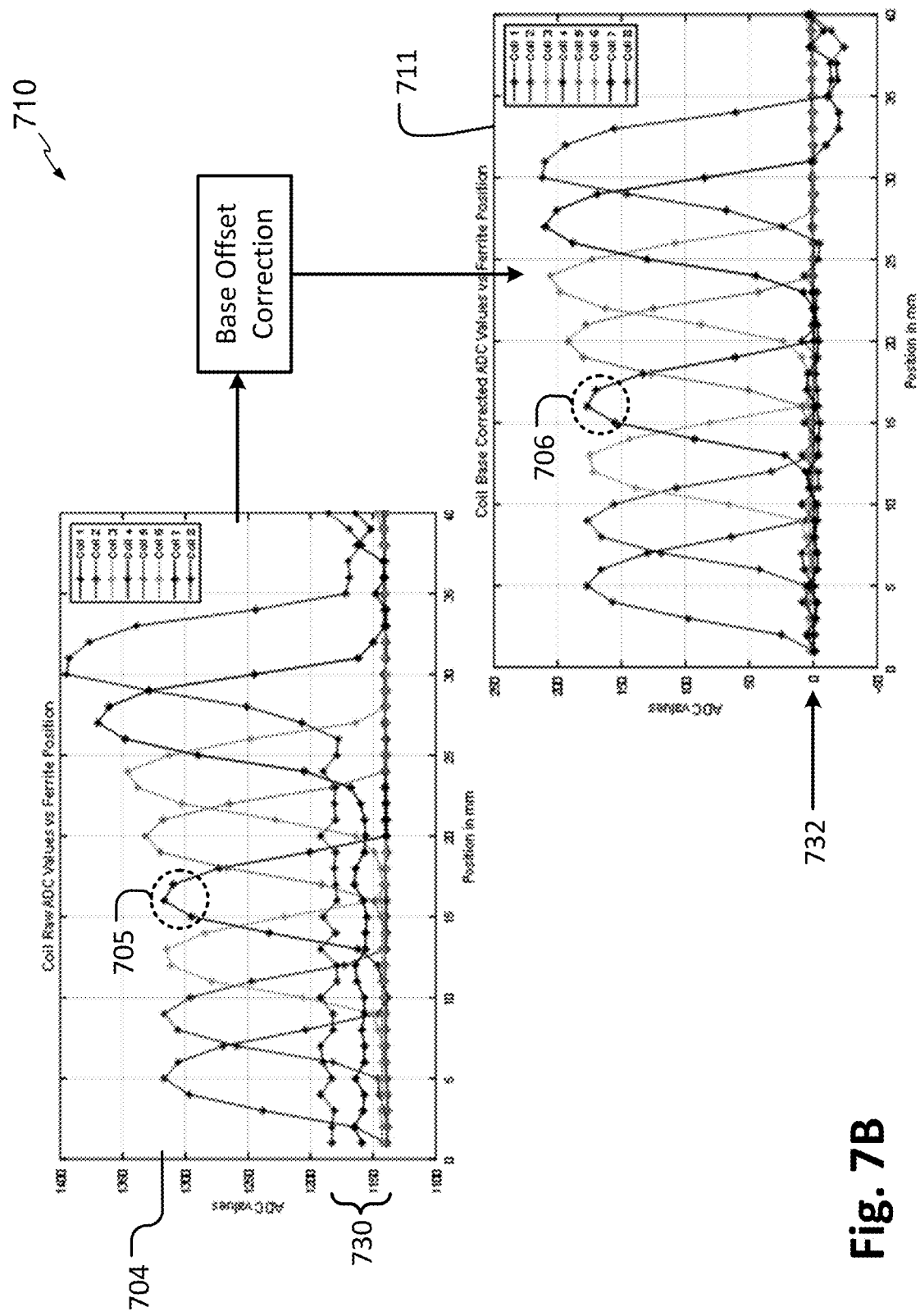
FIG. 7B illustrates an example implementation of a first stage of the processing module shown in FIG. 7A in one embodiment.

FIG. 7A is a block diagram of a processing module 700 that may implement adaptive position detection for inductive linear position sensing in one embodiment. For instance, the processing module 700 may be the processing module 312 shown in FIG. 3, and may be executed by the processor 314 shown in FIG. 3. The processing module 700 may execute a process 702. The process 702 may include four stages: a first stage 710, a second stage 712, a third stage 714, and a fourth stage 716. The first stage 710 may include receiving digital data 704 that may include a plurality of data points converted from voltages generated by one or more sensor coils (e.g., sensor coils 310, 404, 506, 508, 604, 606, or 652, 654 in FIG. 3 to FIG. 6). An example of the digital data 704 is shown in FIG. 7B, where the digital data 704 may include data points corresponding to eight coils labeled as Coil 1 to Coil 8. In an example, the Coil 1 to Coil 8 referenced in FIG. 7B may be arranged as coils in single-ended configuration, such as the configurations shown in FIG. 6A. In another example, the digital data 704 being received by the processing module may correspond to coils in differential configurations as shown in FIG. 6B. In the example shown in FIG. 7B, a subset of data points 705 may be converted from a portion of a voltage generated by Coil 4.

In the first stage 710, the processing module 700 may calibrate the digital data 704 to generate a set of calibrated data 711. An example of the calibrated data 711 is shown in FIG. 7B. Referring to FIG. 7B, the digital data 704 may include data points converted from eight voltage waveforms of eight different coils Coil 1 to Coil 8, and the eight voltage waveforms may have different baseline voltages, or base voltages, within a range 730. In an example, the voltages of different coils may have different base voltages due to different geometry of the coils. The first stage 710 may apply a base voltage subtraction technique on the digital data 704 to generate the calibrated data 711, where the calibrated data 711 may be normalized at the same base voltage 732. The calibrated data 711 may include a plurality of calibrated data points that are translated from the plurality of data points in the digital data 704. For example, in response to the calibration, the subset of data points 705 is translated to a subset of calibrated data points 706 having different digital voltage values. In an example, the baseline voltages of the coils may vary with position changes of the target as well, depending on geometric aspects of the coil configuration. For instance, baseline voltages of the coils may depend on various design components of the phone (e.g., coil characteristics, geometry, target size and/or type, shield material, spacing and/or material between design components, etc.) and the operating conditions such as input voltage and frequency of operation. Once these design components and operating conditions are finalized, a set of baseline offset parameters based on an average set of sample devices (e.g., phones) may be determined. For example, a plurality of baseline voltages of devices having different design components and operating conditions may be obtained, and an average of these baseline voltages may be used for determining the baseline offset parameters. The baseline offset parameter may be used for the first stage 710 to calibrate the digital data 704. In another example, the baseline voltages may need to be further adjusted in response to device-to-device variations. For example, coil voltage data may be collected in factory or production by setting the target at fixed positions, and storing the collected coil voltage data in a non-volatile memory device. Then, the stored coil voltages may be used for further adjusting the baseline voltages resulting from the first stage 710 to address device-to-device variations.

Figure 7C:
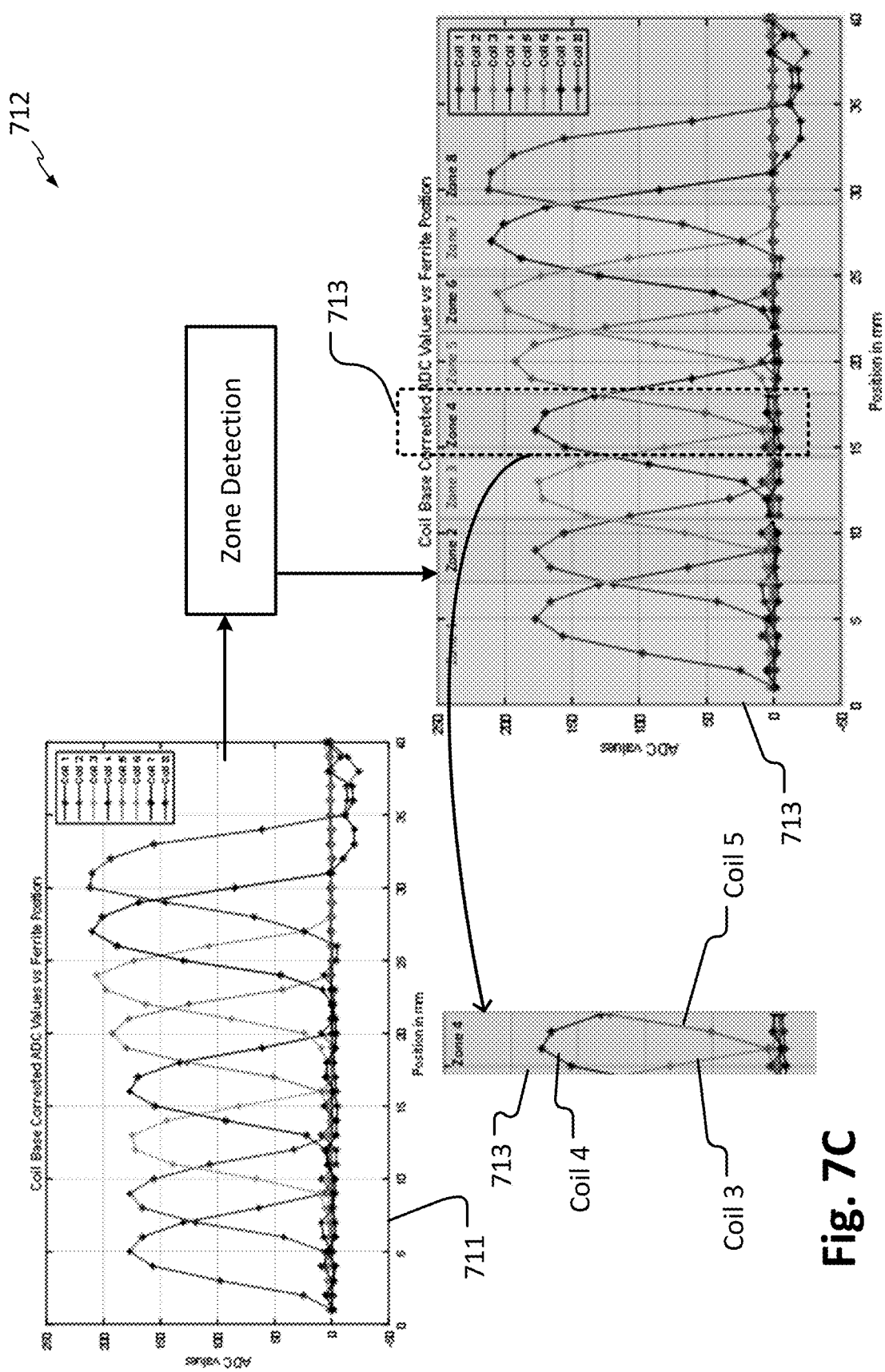
FIG. 7C illustrates an example implementation of a second stage of the processing module shown in FIG. 7A in one embodiment.

The second stage 712 may include receiving the calibrated ADC data 711 from the first stage 710. In the second stage 712, a zone detection technique may be applied on the calibrated data 711 to detect a zone that may include the potential location or position of the display screen (or the moving target). In an example, the zone detection may include filtering out any voltage data points below a specified noise floor, and to identify a number of consecutive coils that have the highest combined signal-to-noise ratio (SNR) or signal to baseline voltage ratio. For example, any calibrated coil voltage among the calibrated data 711 below a noise floor of 5 millivolts (mV) may be discarded or filtered out as they may not be usable due to ADC noise being around the same level as the noise floor. Further, coils with better SNRs may have the larger ADC dynamic range, and may provide better resolution and accuracy for detecting the position of the target. Therefore, resolution of the coil voltages may be used for identifying coils with higher SNR. For example, between 17 mm and 18 mm in the plot of calibrated data 711, Coil 4's voltages may have approximately 40 ADC sampled voltages (e.g., 40 sample voltages per mm) and Coil 5 may have approximately 80 ADC sampled voltages, which are relatively high resolutions and Coil 4 and Coil 5 may be identified for the zone detection. Coils with relatively lower SNR coils, such as those having voltages around 2 to 5 ADC sampled voltages per mm, may not be identified for zone detection. In the example shown in FIG. 7B, Coil 3, Coil 4, and Coil 5 may be identified as the three consecutive coils having the highest combined SNR. In an example shown in FIG. 7C, the second stage 712 may identify up to three coils. Upon identifying the three coils with the highest SNR, a zone that includes at least a portion of each one of the three identified coils (e.g., Zone 4) may be identified or detected. The second stage 714 may output zone data 713 that may include a subset of calibrated data points within the detected zone (e.g., Zone 4) to the third stage 714 for further processing. In an example, the zones may be stored in a memory (e.g., as part of the association data 334 in memory 328 of FIG. 3) and the boundaries and/or size of the zones may be based on coil geometry. For instance, if the detected zone in the second stage 714 is zone 4, then the position of the target may be between approximately 14 mm and 18 mm. But this information itself may be used in the interpolation stage 716 as well. In an example, zone differences based on phone-to-phone variations may be adjusted using the zone data stored in the memory as well. (e.g., stored from factory calibration).

Figure 7D:
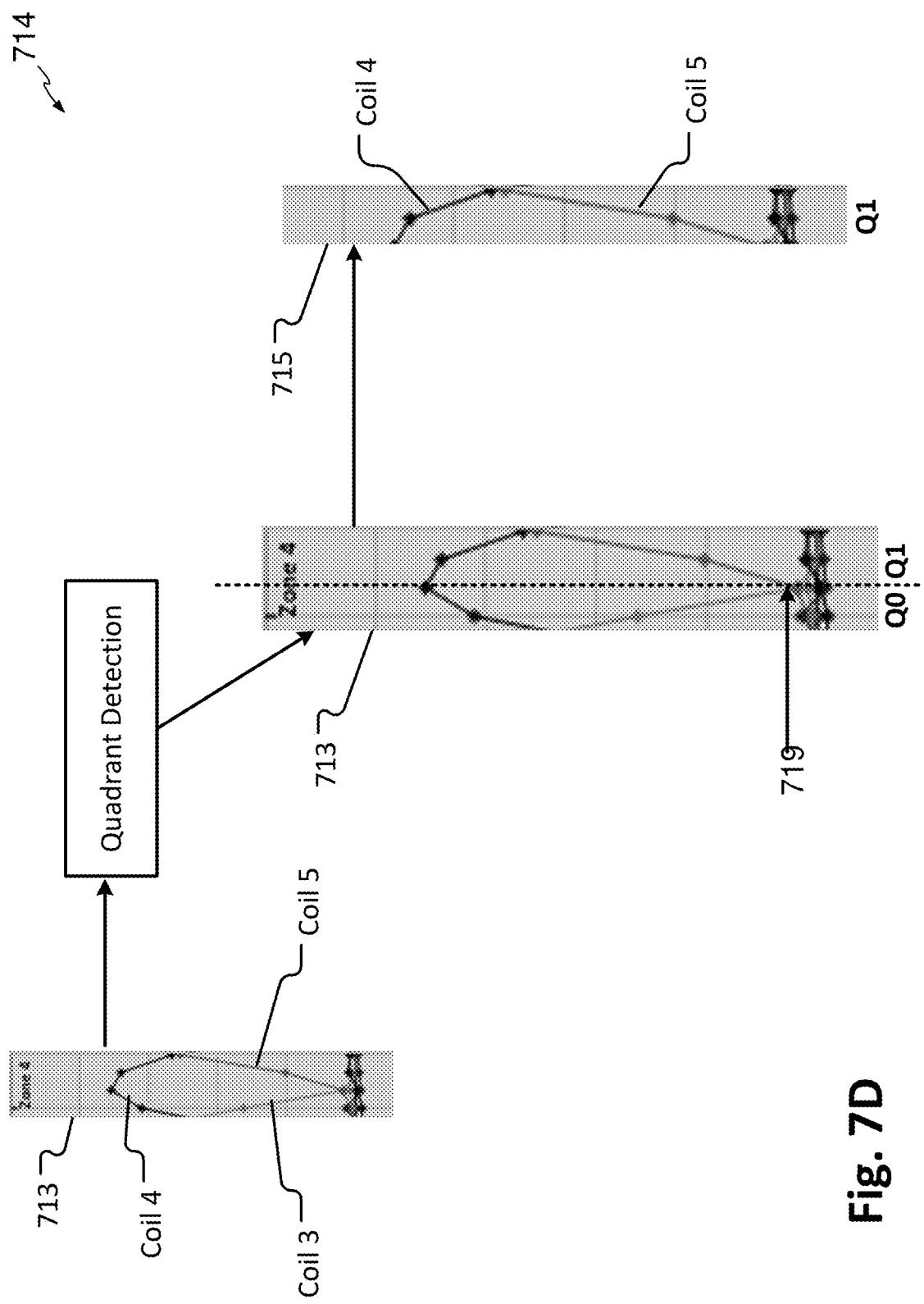
FIG. 7D illustrates an example implementation of a third stage of the processing module shown in FIG. 7A in one embodiment.

The third stage 714 may include receiving the zone data 713 from the second stage 712. The third stage 714 may include detecting a sector, or quadrant, in the detected zone (e.g., Zone 4) based on the calibrated data points in the zone data 713. In an example, each zone may be partitioned into two sectors or quadrants. For example, Zone 4 in the zone data 713 may be partition into two sectors, labeled as Q0 and Q1, in FIG. 7D. The sizes of the Q0 and Q1 may be the same or may be different, depending on a point being used to partition Zone 4. For example, a point 719 in FIG. 7D may be a point where Coil 3's voltage meet Coil 5's voltage within Zone 4, and the point 719 may be the point being used for partitioning Zone 4 into Q0 and Q1, causing Q1 to be larger than the Q0. Upon partitioning the detected zone (e.g., Zone 4) into Q0 and Q1, the third stage 714 may identify or detect a sector among Q0 and Q1. To detect or select a sector among Q0 and Q1, coil data of two coils with lower SNR out of the three high SNR coils (e.g., Coils 3, 4, 5) may be compared. Out of the two coils being compared, the target may be closer to the coil that have higher coil voltages, and the sector including the higher coil voltage may be selected. For instance, in FIG. 7D, if Coil 3's voltage is higher than Coil 5's voltage in Zone 4, then sector Q0 may be selected or identified. If Coil 3's voltage is lower than Coil 5's voltage in Zone 4, then sector Q1 may be selected or identified. Thus, the processing module 700 may set the selected sector as the detected sector that is likely to include the position of the display screen. In an example, in response to detecting Q1, the processing module 700 may generate sector data 715 that may include calibrated data points in Q1.

Note that by partitioning the zone outputted from the second stage 712 into two sectors, the processing module 700 may narrow or refine the range of potential positions of the display screen, thus improving an accuracy of the position determination. For example, by detecting one sector among the two sectors, the processing module 700 may determine whether the position of the display screen is to the left or to the right of the coil in the detected zone.

Figure 7E:
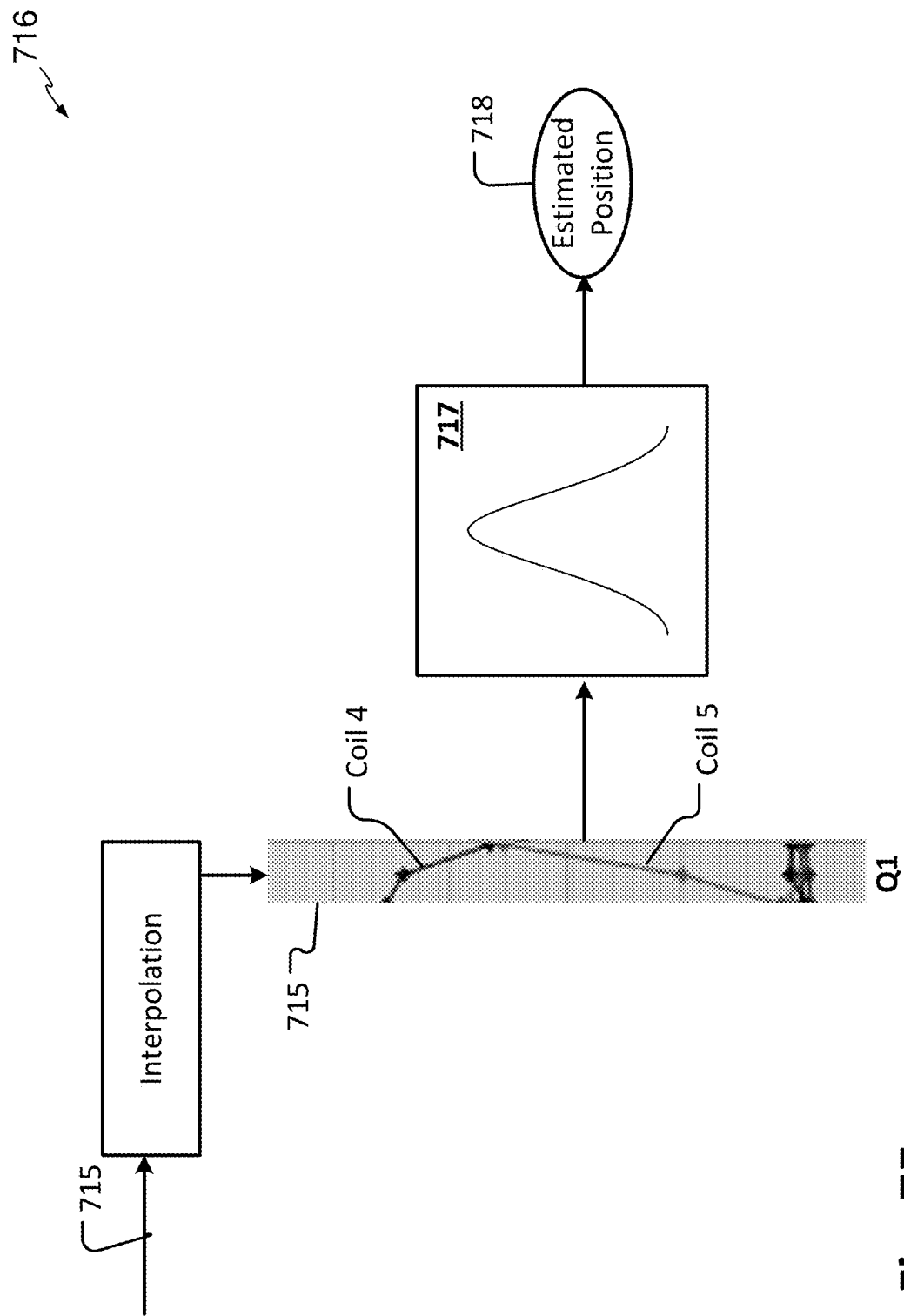
FIG. 7E illustrates an example implementation of a fourth stage of the processing module shown in FIG. 7A in one embodiment.

The fourth stage 716 may include receiving the sector data 715 from the third stage 714. In the fourth stage 716, the processing module 700 may interpolate the calibrated data points in the sector data 715 with a set of known data points. For example, the processing module 700 may apply curve fitting techniques to match or fit the calibrated data points in the sector data 715 with a set of known data points 717 shown in FIG. 7E. In an example, the known data points curve 717 may be associated with one or more positions of the screen within the sector Q1. In an example, the known data points 717 may be stored in, for example, association data 334 in FIG. 3. In an example, the curve fitting techniques may be based on the coil voltages' curve shapes. For example, 3-piece linear interpolation per curve technique, or 4-piece linear interpolation per curve technique may be used. Other example curve fitting techniques can include a second order polynomial curve fitting, and linear or polynomial approximation of the coil voltage curve shapes. A result of the interpolation may be an estimated position 718, where estimated position 718 may be a value indicating an estimated position or estimated amount of expansion of the visible and usable surface area of the display screen. Note that the execution of the processing module 700 may result in interpolation or curve fitting being applied on a relatively smaller amount of data (e.g., calibrated data points in Q1), instead of an entire coil voltage waveform or data points within an entire zone. Thus, the processing module 700 may improve an accuracy of the position determination while consuming less power. The fourth stage 716 may output the estimated position 718 to an IIR filter 722 (see FIG. 7A).

Returning to FIG. 7A, the IIR filter 722 may receive the estimated position 718 from the fourth stage 716, and a previous position 718 of the display screen (e.g., previous output by the IIR filter 722) may be fed back to the IIR filter 722 via a feedback path of the IIR filter 722. The IIR filter 722 may output an infinite impulse response (IIR) that may represent a new position 724 of the display screen. The application of the IIR filter 722 may correct the estimated position using the previous position.

The systems and methods described herein may provide an adaptive position detection process that allows high precision position detection in multiple coil inductive position sensing systems. The adaptive position detection process may be scalable for systems with different coil numbers. Further, the adaptive position detection process may address system noise with adaptive base offset correction per coil (e.g., calibration in first stage 710). Furthermore, the adaptive position detection process may use multiple coil sensing data for each position to handle irregular data or sudden changes in single coil. Still further, the adaptive position detection process may use the previous position of the display screen to correct the estimated position, where the corrected position may be an adjusted or new position indicating a visible and usable surface area of the display screen.

FIG. 8 is a flowchart of an example process 800 that may implement adaptive position detection for inductive linear position sensing in one embodiment. The process 800 may include one or more operations, actions, or functions as illustrated by one or more of blocks 802, 804, 806, and/or 808. Although illustrated as discrete blocks, various blocks can be divided into additional blocks, combined into fewer blocks, eliminated, performed in parallel, and/or performed in a different order, depending on the desired implementation.

The process 800 may begin at block 802. At block 802, a processor may receive a plurality of data points representing a plurality of voltages. The plurality of voltages may be generated by a plurality of sensor coils based on a magnetic flux field. The magnetic flux field may be generated by a plurality of driver coils, and the plurality of voltages may vary with changes in the magnetic flux field. In an example, the plurality of data points may be digital values converted from the plurality of voltages generated by the plurality of sensor coils.

The process 800 may proceed from block 802 to block 804. At block 804, the processor may calibrate the plurality of data points to generate a plurality of calibrated data points. In an example, the processor may calibrate the plurality of data points by applying a base voltage subtraction technique on the plurality of data points.

The process 800 may proceed from block 802 to block 804. At block 804, the processor may filter the plurality of calibrated data points. In an example, the processor may filter the plurality of calibrated data points by identifying a subset of the plurality of calibrated data points corresponding to voltages with highest signal-to-noise ratio. The processor may identify a region of positions based on the identified subset of calibrated data points. The processor may identify a sector of the region of positions based the subset of the calibrated data points in the identified region. The filtered calibrated data points may be within the identified sector.

In an example, the subset of the plurality of calibrated data points may include first calibrated data points, second calibrated data points, and third calibrated data points. The first calibrated data points may represent coil voltages of a first sensor coil among the plurality of sensor coils. The second calibrated data points may represent coil voltages of a second sensor coil among the plurality of sensor coils. The third calibrated data points may represent coil voltages of a third sensor coil among the plurality of sensor coils. The processor may identify the sector of the region by comparing coil voltages of two sensor coils with lower SNRs among the first, second, and third sensor coils. The processor may further select a sector associated with a sensor coil having higher coil voltages among the two sensor coils being compared.

The process 800 may proceed from block 802 to block 804. At block 804, the processor may estimate a position of the structure based on the filtered calibrated data points. The position of the structure may indicate a size of a size changing device. In an example, the processor may estimate the position of the structure by interpolating the filtered data points with a set of known data points. The processor may determine an adjusted position of the structure based on the estimated position and a previous position of the structure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. For example, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining a position of a structure using inductive position sensing, the method comprising:
   receiving a plurality of data points sampled from an analog to digital converter (ADC) and representing a plurality of voltages, the plurality of voltages being generated by a plurality of sensor coils based on a magnetic flux field, the magnetic flux field being generated by a plurality of driver coils, and the plurality of voltages varies with changes in the magnetic flux field;
   calibrating the plurality of data points to generate a plurality of calibrated data points, wherein the plurality of calibrated data points are normalized at a common base voltage in response to the calibrating;
   discarding a portion of the plurality of calibrated data points that are below a specified noise floor;
   identifying a subset of the calibrated data points that remained after the discarding, wherein the identified subset of calibrated data points correspond to consecutive sensor coils with a highest combined signal-to-noise ratio (SNR); and
   estimating a position of the structure based on the identified subset of calibrated data points, wherein the position of the structure indicates a size of a size changing device.

2. The method of claim 1, wherein the plurality of data points are digital values converted from the plurality of voltages generated by the plurality of sensor coils.

3. The method of claim 1, wherein calibrating the plurality of data points comprises applying a base voltage subtraction technique on the plurality of data points.

4. The method of claim 1, further comprising:
   identifying a region of positions based on the identified subset of calibrated data points; and identifying a sector of the region of positions based the subset of the calibrated data points in the identified region, wherein the position of the structure is estimated based on the identified sector.

5. The method of claim 1, wherein the identified subset of calibrated data points comprises:
first calibrated data points representing coil voltages of a first sensor coil among the plurality of sensor coils;
second calibrated data points representing coil voltages of a second sensor coil among the plurality of sensor coils;
third calibrated data points representing coil voltages of a third sensor coil among the plurality of sensor coils, wherein the first sensor coil, the second sensor coil and the third sensor coil are among the consecutive sensor coils; and
identifying the sector of the region comprises:
comparing coil voltages of two sensor coils with lower SNRs among the first, second, and third sensor coils; and
selecting a sector associated with a sensor coil having higher coil voltages among the two sensor coils being compared.

6. The method of claim 4, wherein estimating the position of the structure comprises interpolating data points in the identified sector with a set of known data points.

7. The method of claim 1, further comprising determining an adjusted position of the structure based on the estimated position and a previous position of the structure.

8. An apparatus comprising:
a memory; and
a processor configured to be in communication with the memory, the processor being configured to:
receive a plurality of data points sampled from an analog to digital converter (ADC) and representing a plurality of voltages, the plurality of voltages being generated by a plurality of sensor coils based on a magnetic flux field, the magnetic flux field being generated by a plurality of driver coils, and the plurality of voltages varies with changes in the magnetic flux field;
calibrate the plurality of data points to generate a plurality of calibrated data points, wherein the plurality of calibrated data points are normalized at a common base voltage in response to the calibrating;
discard a portion of the plurality of calibrated data points that are below a specified noise floor;
identify a subset of the calibrated data points that remained after the discarding, wherein the identified subset of calibrated data points correspond to consecutive sensor coils with a highest combined signal-to-noise ratio (SNR); and
estimate a position of a structure based on the identified subset of calibrated data points, wherein the position of the structure indicates a size of a size changing device.

9. The apparatus of claim 8, wherein the plurality of data points are digital values converted from the plurality of voltages generated by the plurality of sensor coils.

10. The apparatus of claim 8, wherein the processor is configured to apply a base voltage subtraction technique on the plurality of data points to calibrate the plurality of data points.

11. The apparatus of claim 8, wherein the processor is configured to:
identify a region of positions based on the identified subset of calibrated data points; and
identify a sector of the region of positions based the subset of the calibrated data points in the identified region, wherein the position of the structure is estimated based on the identified sector.

12. The apparatus of claim 8, wherein the identified subset of calibrated data points comprises:
first calibrated data points representing coil voltages of a first sensor coil among the plurality of sensor coils;
second calibrated data points representing coil voltages of a second sensor coil among the plurality of sensor coils;
third calibrated data points representing coil voltages of a third sensor coil among the plurality of sensor coils, wherein the first sensor coil, the second sensor coil and the third sensor coil are among the consecutive sensor coils; and
the processor is configured to:
compare coil voltages of two sensor coils with lower SNRs among the first, second, and third sensor coils; and
select a sector associated with a sensor coil having higher coil voltages among the two sensor coils being compared.

13. The apparatus of claim 11, wherein the processor is configured to interpolate data points in the identified sector with a set of known data points stored in the memory to estimate the position of the structure.

14. The apparatus of claim 8, wherein the processor is further configured to determining an adjusted position of the structure based on the estimated position and a previous position of the structure.

15. A computer program product for determining a position of a structure using inductive position sensing, the computer program product comprising a computer readable storage medium having program instructions executable by a processor to:
receive a plurality of data points sampled from an analog to digital converter (ADC) and representing a plurality of voltages, the plurality of voltages being generated by a plurality of sensor coils based on a magnetic flux field, the magnetic flux field being generated by a plurality of driver coils, and the plurality of voltages varies with changes in the magnetic flux field;
calibrate the plurality of data points to generate a plurality of calibrated data points, wherein the plurality of calibrated data points are normalized at a common base voltage in response to the calibrating;
discard a portion of the plurality of calibrated data points that are below a specified noise floor;
identify a subset of the calibrated data points that remained after the discarding, wherein the identified subset of calibrated data points correspond to consecutive sensor coils with a highest combined signal-to-noise ratio (SNR); and
estimate a position of the structure based on the identified subset of calibrated data points, wherein the position of the structure indicates a size of a size changing device.

16. The computer program product of claim 15, wherein the plurality of data points are digital values converted from the plurality of voltages generated by the plurality of sensor coils.

17. The computer program product of claim 15, wherein the program instructions are executable by the processor to apply a base voltage subtraction technique on the plurality of data points to calibrate the plurality of data points.

18. The computer program product of claim 15, wherein the identified subset of calibrated data points comprises:

first calibrated data points representing coil voltages of a first sensor coil among the plurality of sensor coils;
second calibrated data points representing coil voltages of a second sensor coil among the plurality of sensor coils;
third calibrated data points representing coil voltages of a third sensor coil among the plurality of sensor coils, wherein the first sensor coil, the second sensor coil and the third sensor coil are among the consecutive sensor coils;

and the program instructions are executable by the processor to:
identify a region of positions based on the identified subset of calibrated data points; and
compare coil voltages of two sensor coils with lower SNRs among the first, second, and third sensor coils; and
select a sector associated with a sensor coil having higher coil voltages among the two sensor coils being compared, wherein the position of the structure is estimated based on the identified sector.

19. The computer program product of claim 18, wherein the program instructions are executable by the processor to interpolate data points in the identified sector with a set of known data points to estimate the position of the structure.

20. The computer program product of claim 15, wherein the program instructions are executable by the processor to determine a final position of the structure based on the estimated position and a previous position of the structure.

* * * * *